(12) United States Patent
Lawrence et al.

(10) Patent No.: US 10,877,823 B1
(45) Date of Patent: Dec. 29, 2020

(54) HIGH PERFORMANCE IN-MEMORY COMMUNICATION INFRASTRUCTURE FOR ASYMMETRIC MULTIPROCESSING SYSTEMS WITHOUT AN EXTERNAL HYPERVISOR

(71) Applicant: Cisco Technology, Inc., San Jose, CA (US)

(72) Inventors: Nivin Lawrence, Fremont, CA (US); Sandesh K. Rao, Fremont, CA (US); Manikandan Veerachamy, Milpitas, CA (US); Amit Chandra, San Jose, CA (US); Tushar Sinha, San Jose, CA (US); Manoj Kumar, Fremont, CA (US); David W. Duffey, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/854,180

(22) Filed: Apr. 21, 2020

Related U.S. Application Data

(60) Provisional application No. 62/946,326, filed on Dec. 10, 2019.

(51) Int. Cl.
   *G06F 9/54* (2006.01)
(52) U.S. Cl.
   CPC .................................. *G06F 9/544* (2013.01)
(58) Field of Classification Search
   CPC ................................ G06F 9/544; G06F 9/546
   USPC .................................................. 719/312, 313
   See application file for complete search history.

(56) References Cited

U.S. PATENT DOCUMENTS

| | | | |
|---|---|---|---|
| 9,053,002 B2 | 6/2015 | Goodman et al. | |
| 9,558,010 B2 | 1/2017 | Even et al. | |
| 9,875,043 B1 | 1/2018 | Suldhal | |
| 2008/0046891 A1* | 2/2008 | Sanchorawala | G06F 9/4405 718/104 |

OTHER PUBLICATIONS

Hwanju Kim, et al., "Virtual Asymmetric Multiprocessor for Interactive Performance of Consolidated Desktops.", Mar. 2014.
U.S. Appl. No. 10/503,492 B2, Dec. 10, 2019, Barrat et al.

* cited by examiner

*Primary Examiner* — Andy Ho
(74) *Attorney, Agent, or Firm* — Baker Botts, LLP

(57) ABSTRACT

The present disclosure is directed to an in-memory communication infrastructure for an asymmetric multiprocessing system without an external hypervisor, and includes one or more processors and one or more computer-readable non-transitory storage media comprising instructions that, when executed by the one or more processors, cause one or more components to perform operations including identifying data for transmission from a first instance to a second instance, writing, by the first instance, the data into a first ring of a shared memory, the first ring configured as a first transmit ring for the first instance, sending an inter-processor interrupt to the second instance to alert the second instance of the data written into the first ring, reading, by the second instance, the data from the first ring, the first ring configured as a first receive ring for the second instance, and transmitting the data to an application of the second instance.

20 Claims, 8 Drawing Sheets

HIGH PERFORMANCE IN-MEMORY COMMUNICATION INFRASTRUCTURE FOR ASYMMETRIC MULTIPROCESSING SYSTEMS WITHOUT AN EXTERNAL HYPERVISOR

CROSS-REFERENCE TO RELATED APPLICATIONS

This application claims priority to and the benefit of U.S. Provisional Patent Application No. 62/946,326, filed on Dec. 10, 2019, which application is incorporated herein by reference in its entirety.

TECHNICAL FIELD

The present disclosure generally relates to asymmetric multiprocessing systems, and more specifically to a high performance in-memory communication infrastructure for an asymmetric multiprocessing system without an external hypervisor.

BACKGROUND

Cooperative Asymmetric Multiprocessing (AMP) without an external hypervisor is used to reduce downtime during router upgrades. During an upgrade, a new (second) kernel instance may be instantiated by the current (first) kernel instance using AMP. The first and second instances may run side-by-side on the same central processing unit (CPU) complex with CPU and memory resources partitioned between the two instances. This approach eliminates the need for an external hypervisor and allows the two instances to run bare-metal in cooperation with one another, until the second instance is deemed ready to take control as the system owner.

DESCRIPTION OF EXAMPLE EMBODIMENTS

Overview

Figure 1:
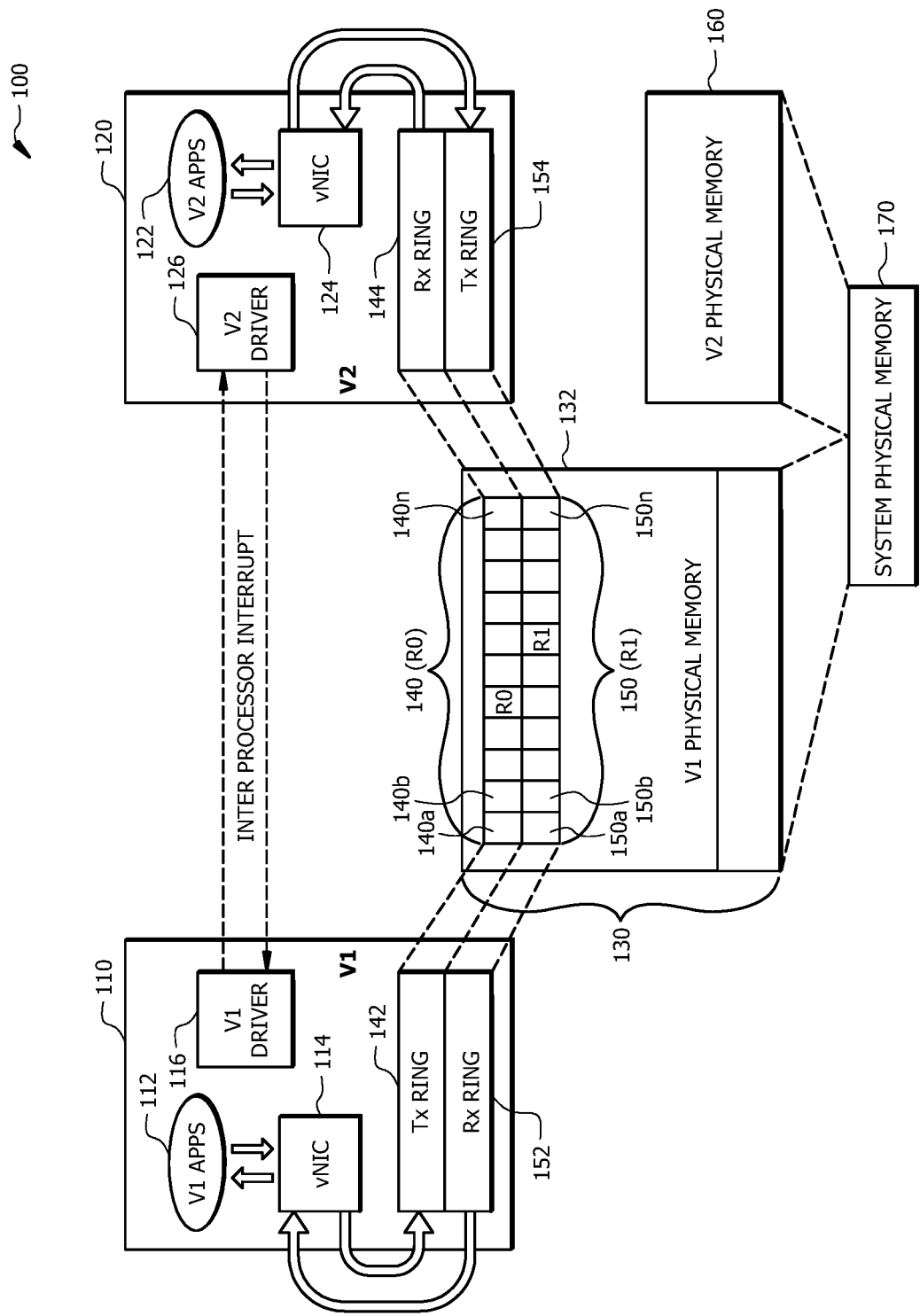
FIG. 1 illustrates a system for in-memory communication between first and second instances in an AMP system without an external hypervisor, in accordance with certain embodiments.

According to an embodiment, a system may include one or more processors and one or more computer-readable non-transitory storage media comprising instructions that, when executed by the one or more processors, cause one or more components of the system to perform operations including, identifying data for transmission from a first instance to a second instance, writing, by the first instance, the data into a first ring of a shared memory, the first ring configured as a first transmit ring for the first instance, sending an inter-processor interrupt to the second instance to alert the second instance of the data written into the first ring, reading, by the second instance, the data from the first ring, the first ring configured as a first receive ring for the second instance, and transmitting the data to an application of the second instance.

Moreover, the data may be written into a first buffer of the first ring, the first buffer being one of a first plurality of buffers in the first ring, each buffer of the first plurality of buffers identified by a sequential index indicating its position among the first plurality of buffers.

Additionally, the operation of writing further may include setting a payload length in a header of the first buffer, the payload length associated with a length of the data, setting a READY bit in the header of the first buffer, and incrementing the sequential index of the first transmit ring.

Furthermore, the operation of incrementing the sequential index of the first transmit ring informs the first instance that its next writing operation comprises writing into a second buffer of the first ring.

Moreover, the operation of reading may include reading the payload length from the header of the first buffer of the first receive ring, copying the data from the first buffer into a memory associated with the second instance, clearing the READY bit from the header of the first buffer, and incrementing the sequential index of the first receive ring.

Additionally, the operations may further include identifying second data for transmission from the second instance to the first instance, writing by the second instance the second data into a second ring of the shared memory, the second ring configured as a second transmit ring for the second instance, sending a second inter-processor interrupt to the first instance to alert the first instance of the second data written into the second ring, reading by the first instance the second data from the second ring, the second ring configured as a second receive ring for the first instance, and transmitting the second data to a second application of the first instance. The second data may be written into a buffer of the second ring, the buffer being one of a second plurality of buffers in the second ring.

According to another embodiment, a method may include the steps of identifying data for transmission from a first instance to a second instance, writing, by the first instance, the data into a first ring of a shared memory, the first ring configured as a first transmit ring for the first instance, sending an inter-processor interrupt to the second instance to alert the second instance of the data written into the first ring, reading, by the second instance, the data from the first ring, the first ring configured as a first receive ring for the second instance, and transmitting the data to an application of the second instance.

According to yet another embodiment, one or more computer-readable non-transitory storage media may embody instructions that, when executed by a processor, cause the performance of operations, including identifying data for transmission from a first instance to a second instance, writing, by the first instance, the data into a first ring of a shared memory, the first ring configured as a first transmit ring for the first instance, sending an inter-processor interrupt to the second instance to alert the second instance of the data written into the first ring, reading, by the second instance, the data from the first ring, the first ring configured as a first receive ring for the second instance, and transmitting the data to an application of the second instance.

Technical advantages of certain embodiments of this disclosure may include one or more of the following. The systems and methods described herein may allow for communication between two instances without the use of an external hypervisor. By eliminating the hypervisor, which is typically only required for system upgrades and not necessary to the regular operation of the system router, the system may increase performance and decrease management overhead. In other embodiments, the systems and methods of the present disclosure provide a mechanism for seamlessly and transparently switching disk access of an instance from a network-based access to a direct access (and vice versa) via a disk abstraction. In still other embodiments, the systems and method of the present disclosure provide a mechanism for migration from a statistically provisioned (thick) logical volume to a virtual over-provisioned (thin) logical volume to enable the sharing of unused storage space across a plurality of logical volumes, without an overall system downtime.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

As described above, cooperative AMP without an external hypervisor is used to reduce application downtime during router software upgrades. During a software upgrade, a new (second) kernel instance may be instantiated by the current (first) kernel instance using AMP. The first and second instances may run side-by-side on the same central processing unit (CPU) complex with CPU and memory resources partitioned between the two instances. Once the applications in the second instance is deemed ready, the first instance may be shutdown, marking the beginning of the application downtime. Then, the second instance may assume control of the system, reinitialize hardware, and complete the software upgrade sequence, marking the end of the application downtime. The application downtime is now reduced to the short time taken by second instance to reinitialize hardware, which is a fraction of the overall regular software upgrade time. This approach eliminates the need for an external hypervisor and allows the two instances run bare-metal in cooperation with one another.

The following concepts, which are described in the present disclosure, may assist in the process of AMP-based software upgrades without an external hypervisor:
1. A high performance in-memory communication infrastructure to allow communication between the two AMP instances during a software upgrade, which will help second instance act like a diskless system accessing the LVM/disk partitions remotely over a network;
2. A mechanism for seamless access to the common physical disk from second kernel instance, to allow application boot and continued operation post software upgrade completion, thereby allowing the kernel and applications in the second instance to be unaware of the fact that it may access the disk over network initially and then switch to accessing disk natively; and
3. An ability to restructure a thick provisioned disk layout to thin provisioned layout dynamically to accommodate new partitions needed for software upgrades. This is the first step to ensure the new software is installed in the disk irrespective of the current LVM partitioning.

Each of these will be addressed in turn.

High Performance in-Memory Communication Infrastructure for AMP Systems without an External Hypervisor An AMP may be used to reduce downtime during router upgrades. Specifically, during an upgrade, a new (second) instance comprising a Network Operating System (NOS) kernel may be instantiated using AMP to run in parallel with the current (first) instance. This approach may eliminate the need for an external hypervisor and may allow the first and second instances to run bare-metal in cooperation with one another. The first and second instances may share memory infrastructure, wherein the first instance may be associated with a first portion of the shared memory, and the second instance may be associated with a second portion of the shared memory. However, and there is no mediation or communication between the two instances and/or first and second portions of the shared memory. A mechanism is needed to allow communication between the first and second instances. Communication between the two instances may be beneficial to allow the second instance to access disk partitions remotely and also for communication between applications running on the first and second instances to stay in sync.

FIG. 1 depicts a system 100 for in-memory communication between a first instance and a second instance, according to the present disclosure. System 100 may include a first instance 110 and a second instance 120. The first instance 110 may include one or more applications 112, a controller 114, and a driver 116. Likewise, the second instance 120 may include one or more applications 122, a controller 124, and a driver 126. In some embodiments, controllers 114, 124 may comprise virtual network interface controllers (vNICs). In some embodiments, drivers 116, 126 may comprise Inter-Kernel Communication Drivers. The first instance may be associated with a first physical memory 130, and the second instance may be associated with a second physical memory 160. The first physical memory 130 and the second physical memory 160 may be parts of a system physical memory 170.

The first instance 110 may instantiate the second instance 120, and in doing so, the first instance 110 may pass the physical address information of a portion of memory 132 of the first physical memory 130 dynamically allocated to the first instance 110 to the second instance 120. The first instance 110 may pass this physical address information as a boot time parameter to the second instance 120, and the second instance 120 may map this physical address to a virtual address space associated with the second instance 120. Once this memory 132 is mapped into the virtual address space of the second instance 120, a new driver may create an Ethernet interface which may use this shared memory 132 between the first and second instances to emulate a point-to-point network. For clarity, memory 132 may refer to the shared memory corresponding to the physical address space of the first instance 110 and the virtual address space of the second instance 120.

The point-to-point network may include two rings 140, 150 (e.g., R0 and R1) in the shared memory 132. The first ring (R0) 140 may correspond to a transmit ring (Tx) 142 for the first instance 110 and may correspond to a receive ring (Rx) 144 for the second instance 120. Similarly, the second ring (R1) 150 may comprise a transmit ring (Tx) 154 for the second instance 120 and a receive ring (Rx) 152 for the first instance 110. The present disclosure may refer to the transmit ring 142 of the first instance 110 as the "first transmit ring" and the receive ring 144 of the second instance 120 as the "first receive ring." Likewise, the present disclosure may refer to the transmit ring 154 of the second instance 120 as the "second transmit ring" and the receive ring 152 of the first instance 110 as the "second receive ring." The first ring (R0) 140 may include a first plurality of buffers 140*a-n* (only buffers 140*a*, 140*b*, and 140*n* are shown in FIG. 1). Likewise, the second ring (R1) may include a second plurality of buffers 150*a-n* (only buffers 150*a*, 150*b*, and 150*n* are shown in FIG. 1). In an embodiment, each ring (R0 and R1) 140, 150 may include, e.g., 64 buffers, and each buffer 140*a-n* may include a 4-byte buffer header, which includes control information such as a "READY" bit, data length, etc. Each buffer 140*a-n* may also include a 1596-byte buffer payload corresponding to the actual data to be transmitted. Moreover, each buffer in the first and second rings 140, 150 may be identified by a sequential index, which corresponds to the position of the given buffer among the first and second plurality of buffers 140*a-n*, 150*a-n*. For example, if first and second rings 140, 150 have 64 buffers each, the sequential index of the first and second plurality of buffers 140*a-n*, 150*a-n* may range from 0 to 63 for each ring. Further, the sequential index may correspond to the offset of the given buffer from the starting position. For example, a first buffer 140*a* of the first ring 140 may correspond to a sequential index of 0, a second buffer 140*b* of the first ring 140 may correspond to a sequential index of 1, and so on.

In operation, communication between the first instance 110 and the second instance 120 may occur as follows. Data may be identified for transmission from the first instance 110 to the second instance 120. The data may comprise a data packet which may be sent by an application 112 in the first instance 110 to a particular interface controller (e.g., vNIC) 114 created in the first instance 110. The controller 114 of the first instance 110 may pass this data on to the driver 116, which may write the data into the first ring (R0) 140, which, as described above, may correspond to the first transmit ring 142 for the first instance 110. Specifically, the first instance 110 writes the data to the 1596-byte buffer payload of a first buffer 140*a* of the first ring 140. The first instance 110 also sets the payload length (indicating the length of the data) in a header of the first buffer 140*a*, sets the READY bit in the header of the first buffer 140*a*, and increments the sequential index associated with the first transmit ring 142 of the first ring 140 (e.g., from 0 to 1). By incrementing the sequential index of the first transmit ring 142, the first instance 110 will know that the next time it writes into the first ring 140 (corresponding to first transmit ring 142), it should write into the next buffer 140*b*.

Once the data has been written into the first ring 140, the driver 116 of the first instance 110 may send an interprocessor interrupt (IPI) to the second instance 120 to alert the second instance 120 of the data written into the first ring 140. The second instance 120 may read the data from the first ring 140. The first ring 140 may be configured as a first receive ring 144 for the second instance 120. The second instance 120 will be expecting data in the first buffer 140*a* and upon receiving the IPI, the second instance 120 will determine whether the READY bit is set for the first buffer 140*a*. The second instance 120 may also read the payload length from the header of the first buffer 140*a*, and copy the data (payload length worth of data) from the first buffer 140*a* into a memory 160 associated with the second instance 120. The second instance 120 may also clear the READY bit from the header of the first buffer 140*a*, and increment the sequential index associated with the first receive ring 144 of the first ring 140. By incrementing the sequential index of the first receive ring 144, the second instance 120 will know that the next time it reads from the first ring 140 (corresponding to first receive ring 144), it should read from the next buffer 140*b*. The data may then be transmitted to an application 122 of the second instance 120, thereby completing a communication of data from the first instance 110 to the second instance 120.

If the application 122 of the second instance prepares a response to the data sent by first instance 110, the entire process may repeat in the reverse direction. Specifically, data (referenced hereafter as "second data" to distinguish from the initial data that was sent by the first instance) which has been prepared and identified for transmission from the second instance 120 to the first instance 110 may be sent to a controller (e.g., vNIC) 124 created in the second instance 120. The controller 124 of the second instance 120 may pass this second data on to the driver 126, which may write the second data into the second ring (R1) 150, which, as described above, may correspond to a second transmit ring 154 of the second instance 120. Specifically, the second instance 120 may write the second data to the 1596-byte buffer payload of a first buffer 150*a* of the second ring 150. The first buffer 150*a* may be one of a second plurality of buffers 150*a-n* in the second ring 150. The second instance 120 may also set the payload length (indicating the length of the data) in a header of the first buffer 150*a*, set the READY bit in the header of the first buffer 150*a*, and increment the sequential index of the second transmit ring 154 (e.g., from 0 to 1). By incrementing the sequential index of the second transmit ring 154, the second instance 120 will know that the next time it writes into the second ring 150 (corresponding to second transmit ring 154), it should write into the next buffer 150*b*.

The driver 126 of the second instance 120 may then send an IPI to the first instance 110 to alert the first instance 110 of the second data written into the second ring 150. The first instance 110 may read the second data from the second ring 150. The second ring 150 may be configured as a second receive ring 152 for the first instance 110. The first instance 110 will be expecting second data in buffer 150*a* and upon receiving the IPI, the first instance 110 will determine whether the READY bit is set for the first buffer 150*a*. The first instance 110 may also read the payload length from the header of the first buffer 150*a*, copy the data (payload length worth of data) from the first buffer 150*a* into a memory 130 associated with the first instance 110, clear the READY bit from the header of the first buffer 150*a*, and increment the sequential index of the second receive ring 152 of the first instance 110. By incrementing the sequential index of the second receive ring 152, the first instance 110 will know that the next time it reads from the second ring 150 (corresponding to second receive ring 152), it should read from the next buffer 150*b*. Then, the second data may be transmitted to an application 112 of the first instance 110, thereby completing a communication of second data from the second instance 120 to the first instance 110.

The next data packet sent by the first instance 110 may follow the same sequence of steps described above, except that data would now be written into the second buffer 140*b* of the first ring 140 (corresponding to the first transmit ring 142 of the first instance 110). The process may be repeated, allowing the first instance 110 to add data to the first plurality of buffers 140*a-n* in the first ring (R0) 140 and the second instance 120 to consume the data in sequence from the first to the last buffer of the first plurality of buffers 140*a-n*, and then cycling back to the first buffer 140*a* again.

Figure 2:
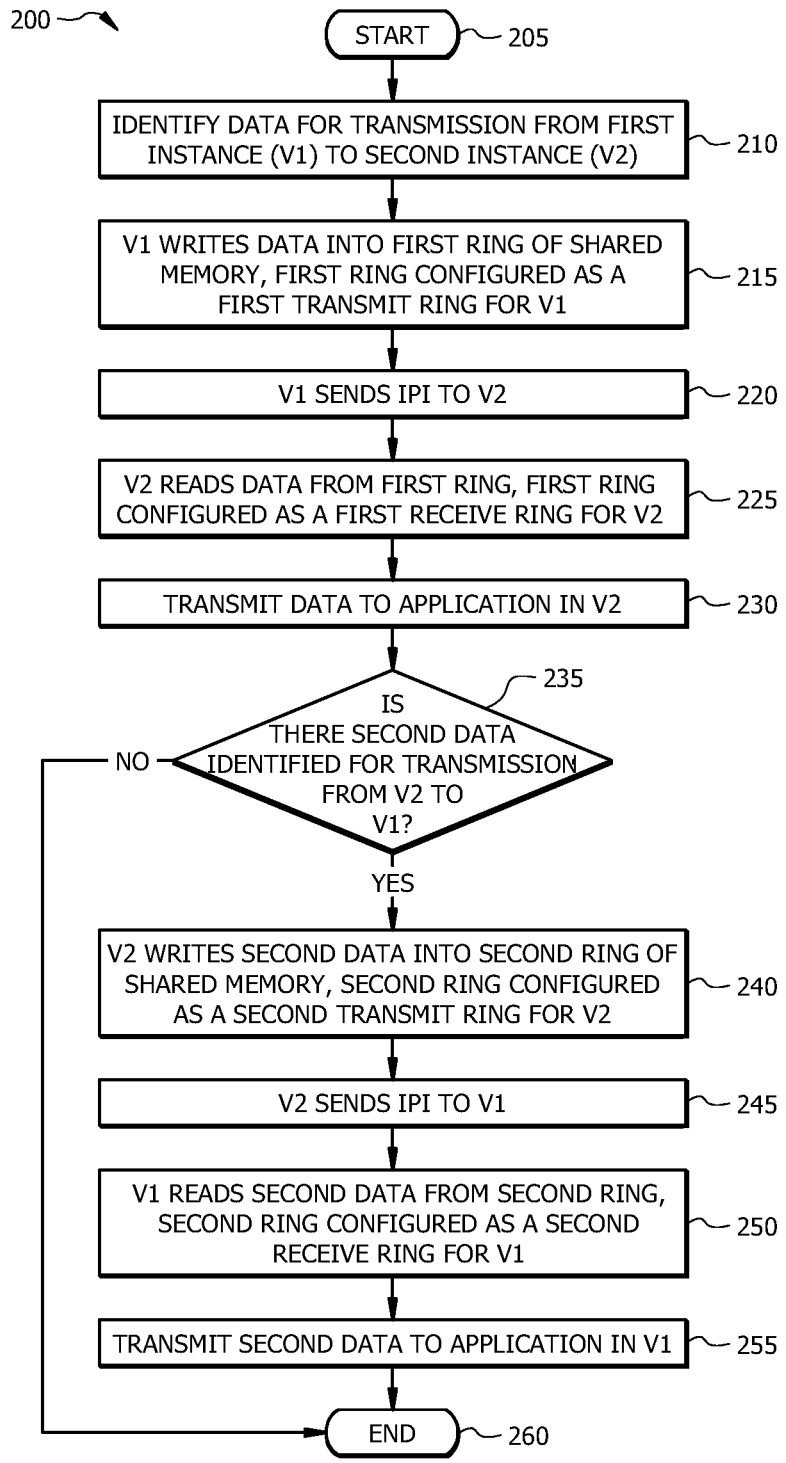
FIG. 2 illustrates a flow diagram of a method for in-memory communication between first and second instances in an AMP system without an external hypervisor, in accordance with certain embodiments.

Reference is now made to FIG. 2, wherein is shown a method 200 for establishing in-memory communication between a first instance and a second instance, according to the present disclosure. Method 200 presumes the completion of certain prerequisite steps that may allow a first instance and a second instance to use a shared memory that may emulate a point-to-point network. Specifically, the first instance may instantiate the second instance, and in doing so, the first instance may pass the physical address information of a portion of memory dynamically allocated in the first instance to the second instance. The first instance may pass this physical address information as a boot time parameter to the second instance, and the second instance may map this physical address to its virtual address space. Once this memory is mapped into the virtual address space of the second instance, a new driver may create an Ethernet interface which may use this shared memory between the first and second instances to emulate a point-to-point network.

The point-to-point network may include two rings (e.g., R0 and R1) in the shared memory. The first ring (R0) may comprise a first transmit ring for the first instance and a first receive ring for the second instance. Similarly, the second ring (R1) may comprise a second transmit ring for the second instance and a second receive ring for the first instance. Each ring (R0 and R1) may include a first and second plurality of buffers. In some embodiments, each ring may comprise 64 buffers, and each buffer may include a 4-byte buffer header, which includes control information such as a "READY" bit, data length, etc. Each buffer may also include a 1596-byte buffer payload corresponding to the actual data to be transmitted. Moreover, each buffer of the plurality of buffers in the first and second rings may be identified by a sequential index, which may correspond to the position of the given buffer among the first and second plurality of buffers. More specifically, the sequential index, ranging from 0 to 63, may correspond to the offset of the given buffer from the starting position.

Method 200 may begin at step 205. At step 210, data may be identified for transmission from a first instance to a second instance. The data may comprise a data packet which may be sent by an application in the first instance to a particular interface controller created in the first instance. In an embodiment, the interface controller may comprise a vNIC. At step 215, the first instance may write the data into a first ring (R0) of the shared memory. The first ring may be configured as a first transmit ring for the first instance. Specifically, the first instance may write the data to the 1596-byte buffer payload of a first buffer of the first ring. The first buffer may be one of a first plurality of buffers in the first ring, and each buffer of the first plurality of buffers may be identified by a sequential index indicating its position among the first plurality of buffers. In an embodiment, the first buffer may correspond to the starting buffer from the first plurality of buffers and may have a sequential index of zero (0). The step 215 of writing the data into the first ring may also include setting the payload length (indicating the length of the data) in a header of the first buffer, setting a READY bit in the header of the first buffer, and incrementing the sequential index of the first transmit ring. Thus, for a first buffer having a sequential index of 0, the sequential index may be incremented to 1. The step of incrementing the sequential index of the first transmit ring may inform the first instance that the next time it writes into the first transmit ring, it will write into the next buffer of the first transmit ring.

At step 220, the first instance may send an IPI to the second instance to alert the second instance of the data written into the first ring. At step 225, the second instance may read the data from the first ring. The first ring may be configured as a first receive ring for the second instance. The step 225 of reading the data may further include reading the payload length from the header of the first buffer of the first receive ring, and copying the data (payload length worth of data) from the first buffer into a memory associated with the second instance, clearing the READY bit from the header of the first buffer, and incrementing the sequential index of the first receive ring. By incrementing the sequential index of the first receive ring, the second instance may be informed that the next time it reads from the first receive ring, it will read from the next buffer of the first receive ring. At step 230, the data may be transmitted to an application of the second instance.

At step 235, a determination may be made as to whether second data has been identified for transmission from the second instance to the first instance. The second data may correspond to a response of the application of the second instance to the data sent by the application of the first instance. If, at step 235, it is determined that second data has not been identified for transmission from the second instance to the first instance, the method may end at step 260. If, however, it is determined that second data has been identified for transmission from the second instance to the first instance, the method may proceed to step 240, wherein the second instance may write the second data into a second ring (R1) of the shared memory. The second ring may be configured as a second transmit ring for the second instance. Specifically, the second instance may write the second data to the buffer payload of a first buffer of the second ring. The first buffer may be one of a second plurality of buffers in the second ring. As described in conjunction with the first ring, each buffer of the second plurality of buffers of the second ring may be identified by a sequential index indicating its position among the second plurality of buffers. The step 240 of writing the second data into the second ring may also include setting the payload length (indicating the length of the second data) in a header of the first buffer of the second ring, setting a READY bit in the header of the first buffer of the second ring, and incrementing the sequential index of the second transmit ring of the second ring. By incrementing the sequential index of the second transmit ring, the second instance will know that the next time it writes into the second ring (corresponding to second transmit ring), it should write into the next buffer. Thus, for a first buffer having a sequential index of 0, the sequential index may be incremented to 1.

At step 245, the second instance may send an IPI to the first instance to alert the first instance of the second data written into the second ring. At step 250, the first instance may read the second data from the second ring. The second ring may be configured as a second receive ring for the first instance. The step 250 of reading the data may further include reading the payload length from the header of the first buffer of the second receive ring, and copying the data (payload length worth of data) from the first buffer into a memory associated with the first instance, clearing the READY bit from the header of the first buffer, and incrementing the sequential index of the second receive ring of the first instance. By incrementing the sequential index of the second receive ring, the first instance will know that the next time it reads from the second ring (corresponding to second receive ring), it should read from the next buffer. At step 255, the second data may be transmitted to an application of the first instance. At step 260, the method may end.

The next data packet (third data) sent by the first instance may follow the same sequence of steps described above, except that data would now be written into the second buffer of the first ring, which corresponds to the first transmit ring of the first instance. The process may be repeated, allowing the first instance to add data to the first plurality of buffers in the first ring (R0) and the second instance to consume the data in sequence from the first to the last buffer of the first plurality of buffers, and then cycling back to the first buffer of the first ring again. Likewise, the second instance may add data to the second plurality of buffers in the second ring (R1) and the first instance may consume the data in sequence from the first buffer to the last buffer of the second plurality of buffers, and then cycle back to the first buffer of the second ring again.

In sum, the systems and methods of the present disclosure may allow for communication between the first and second instances, which communication may be beneficial for applications running on the first and second instances.

Mechanism for Seamless Access to Common Physical Disk(s) Across an AMP System without an External Hypervisor In an AMP environment without an external hypervisor, a first instance may instantiate a second instance during a system upgrade. The two instances may run in parallel, but because all hardware (i.e., the physical disk) is owned and controlled by the first instance, the second instance may not be given direct disk access until after the first instance shuts down. A mechanism is needed to allow the second instance to access the disk seamlessly during the upgrade process, and more specifically, to enable the second instance to access the disk over the network initially when the first instance is active, and then transparently switch to accessing the disk natively when the first instance shuts down and the second instance takes control of the system.

Thus, in accordance with the present disclosure, a disk abstraction may be created so that all applications running on the system may access the disk file system via the disk abstraction. The disk abstraction may present a unified view of the disk(s) or disk partitions accessed, regardless of whether the disks and/or partitions are accessed directly or through the network. Thus, a first instance and a second instance may use the disk abstraction to seamlessly and transparently switch from network-based access to direct disk access (or vice versa).

Figure 3A:
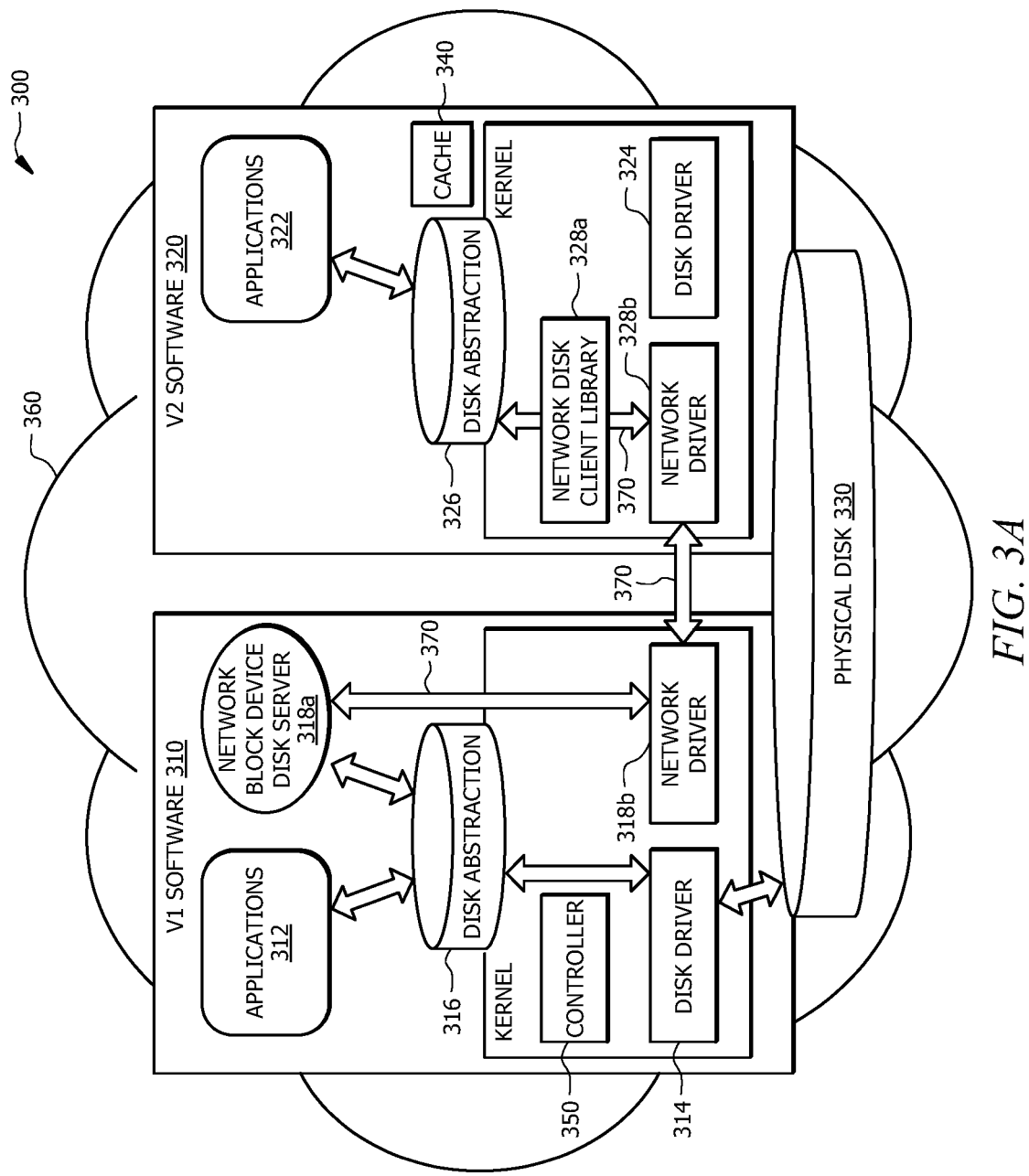
FIG. 3A illustrates a system for seamless network access by a second instance to a common physical disk in an AMP system without an external hypervisor, in accordance with certain embodiments.
Figure 3B:
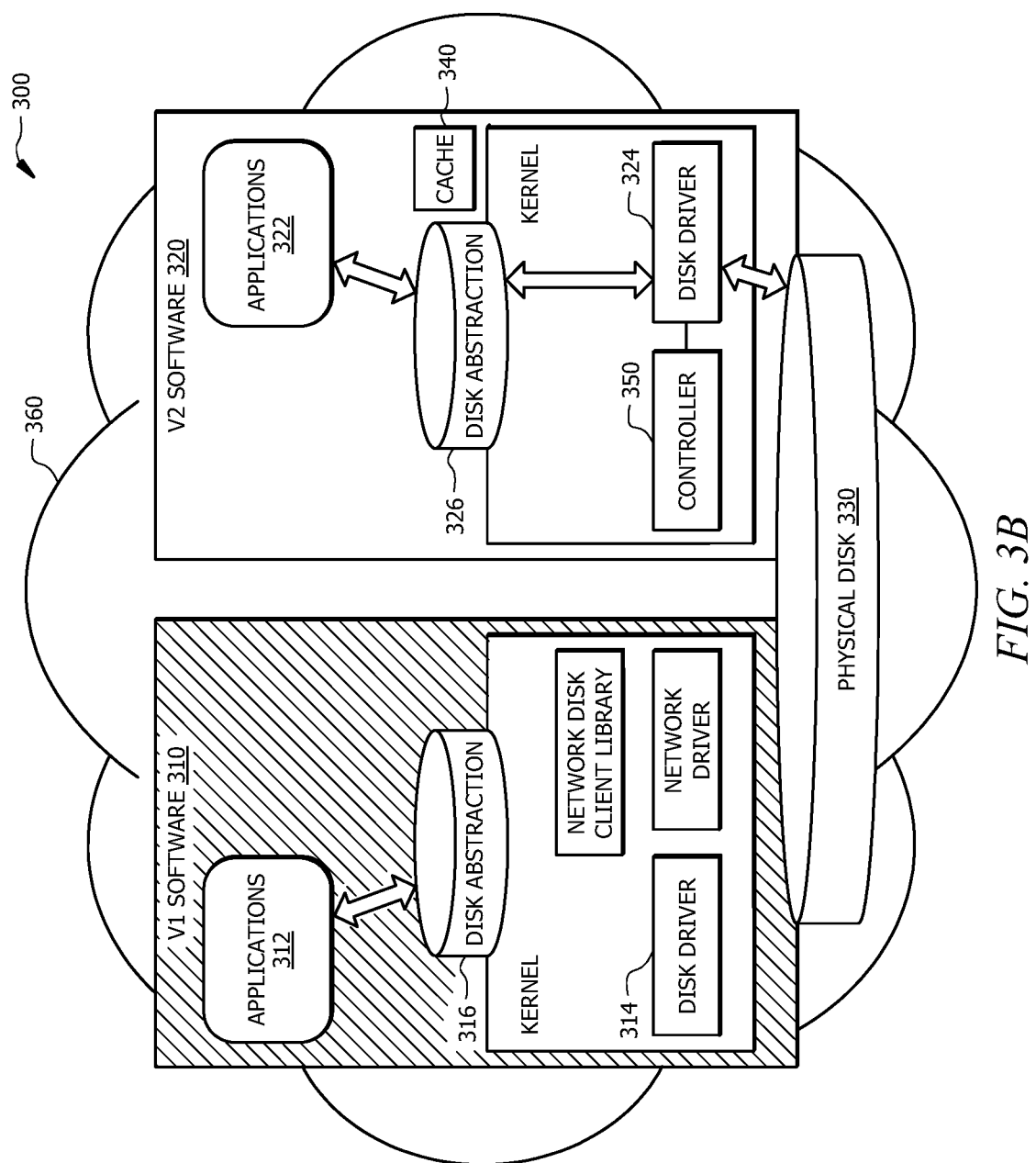
FIG. 3B illustrates a system for seamless native access by a second instance to a common physical disk in an AMP system without an external hypervisor, in accordance with certain embodiments.

Reference is now made to FIGS. 3A and 3B, wherein are shown an AMP system 300 for seamlessly accessing a common physical disk shared between a first instance and a second instance, according to the present disclosure. FIG. 3A illustrates the system 300 during upgrade when the first instance is active and the second instance accesses the physical disk over a point to point network, and FIG. 3B illustrates the system 300 after completion of the upgrade when the first instance shuts down and the second instance takes over and accesses the physical disk natively.

System 300 may include a first instance 310 (including software running thereon) and a second instance 320 (including software running thereon) in a network 360. The first instance 310 and the second instance 320 may access one or more physical disks 330, as described more fully below. The first instance 310 may include one or more applications 312 and a disk driver 314. Disk driver 314 may comprise a kernel-based device driver for the disk controller and may be responsible for read/write access from/to the physical disk 330. In general, applications 312 may access one or more physical disks 330 via disk driver 314. The first instance 310 may further include a first disk abstraction 316 and one or more network blocks, including network block device disk server 318*a* and network driver 318*b*. The second instance 320 may also include one or more applications 322 and a disk driver 324. The second instance may also include a disk abstraction 326 and one or more network blocks, including network disk client library 328*a* and network driver 328*b*. The network drivers 318*b*, 328*b* may allow communication over a network 370 and may each comprise a shared memory-based communication mechanism. Network driver 318*b* may facilitate communication with the second instance 320, and network driver 328*b* may facilitate communication with the first instance 310. Network block device disk server 318*a* may comprise an Internet Small Computer Systems Interface (iSCSI)/Network Block Device (NBD)/ATA over Ethernet (AoE) server, which may allow a remote client to access the data of the physical disk 330 over an underlying network 370. Likewise, network disk client library 328*a* may comprise an iSCSI/NBD/AoE equivalent client which accesses the physical disk 330 remotely over a network 370, and is typically used for systems without a local disk drive. Network 370 may comprise a point to point network established via a shared memory.

In operation, after the system upgrade begins, the network block device disk server 318*a* may be created in the first instance 310. The network block device disk server 318*a* may be used to expose the disk partitions (created in physical disks 330 for use by the second instance 320) to the second instance 320. Specifically, the network block device disk server 318*a* may expose the disk partitions using block devices over network protocols such as NBD, AoE, iSCSI, and the like. Thus, clients (via network disk client library 328*a*) in the second instance 320 may be able to access the disk partitions on physical disks 330 using the network block device client/server mechanisms over the network 370 from the first instance 310. In an embodiment, in the first instance 310, a disk abstraction 316 may be created for each block device that is available on the physical disk 330. Once the disk abstractions 316 for all block devices required by the second instance 320 have been created in the first instance 310, the partitions needed by the second instance 320 may be exported using network block device disk server 318*a*. By way of example, if partitions/dev/330-test1 and/dev/330-test2 of the physical disk 330 are needed by the second instance 320, /dev/316-test1, /dev/316-test2 may be created in the first instance 310 as disk abstractions pointing to block devices/dev/310-test1 and/dev/310-test2, respectively. Then, the AoE server may be started with/dev/316-test1 identified as 1.1 and/dev/316-test2 identified as 1.2.

With continued reference to FIG. 3A, when the second instance 320 boots in RAM, the second instance 320 may probe the block devices over the network 370. For each block device that is found by the second instance 320, a corresponding network block device may be created in the second instance 320. In an embodiment, the network disk client library 328*a* may communicate with an application, such as AoE, to find the block devices exported by the network block device disk server 318*a*. By way of example the block devices may be named/dev/test1, /dev/test2, etc. The network disk client library 328a may then create one local device (such as /dev/e1.1, /dev/e1.2, etc.) for each of the remote block devices it detects. These devices (/dev/e1.1, /dev/e1.2) may be mounted locally in the second instance 320, which will allow applications 322 in the second instance 320 to access files on the file system pointed to by, e.g., /dev/e1.1, /dev/e1.2 etc.

Additionally, for each block device found by the second instance 320, a corresponding disk abstraction 326 may be created in the second instance 320. The network block devices may be attached under their corresponding disk abstractions 326 in the second instance 320. In an embodiment, the second instance 320 may probe for AoE devices on the network and find two devices, identified as 1.1 and 1.2 by the first instance 310. It may name them/dev/328a-1.1, /dev/328a-1.2 locally. Finally, the second instance may create abstractions/dev/326-test1, /dev/326-test2, which map to devices/dev/328a-1.1, /dev/238a-1.2, and make them available for the operating system to mount and use.

With respect to usage, the disk abstractions 326 created in second instance 320 can now be used to mount the network block devices in the second instance 320. The applications 322 in second instance 320 can now access all the files in the filesystem and be fully functional.

Any files which are accessed by applications 322 in the second instance 320 may be cached in the local RAM-based cache 340. Thus, when an application 322 tries to get data from the filesystem, the first access will be to cache 340 to see if the data is available locally before going and accessing the network block device. Specifically, when applications 322 in the second instance 320 try to read from a file, a request is sent by the applications 322 to the cache 340. If no data is found in the cache, then the applications 322 may access the physical disks 330 over the network 370, i.e., in the following order via disk abstraction 326, network disk client library 328a, network driver 328b, network driver 318b, network block device disk server 318a, disk abstraction 316, disk driver 314, and finally to physical disks 330. A similar return path may be traversed resulting in data transmitted from the physical disks 330 to applications 322.

At the point when the second instance 320 boot is complete and the first instance 310 is ready to shut down, the second instance 320 may suspend access to the physical disks 330 via the disk abstractions 326. As a result, during this time, all block-device access from the second instance 320 may only be served from a disk cache 340. In other words, all disk access from the second instance 320 would use cached disk data, and access to uncached data will result in the application blocking on data availability. The first instance 310 may then be shut down.

With reference now to FIG. 3B (depicting the system 300 after the system upgrade is complete and the first instance 310 has shut down), the second instance 320 may probe for a physical disk controller 350. The second instance 320 may enumerate the disk controller 350, load the disk driver 324, and make the block-devices available locally.

Once the V2 kernel sees block-devices locally, the suspended block-device-abstraction 326 in the second instance 320 may be remapped to point to sectors in the local block-devices and may resume operations. As the block-device which was accessed over the network (element 370 in FIG. 3A) earlier and the block-device being accessed directly and natively now are the same physical-block-device, the switch will be seamless.

Figure 4:
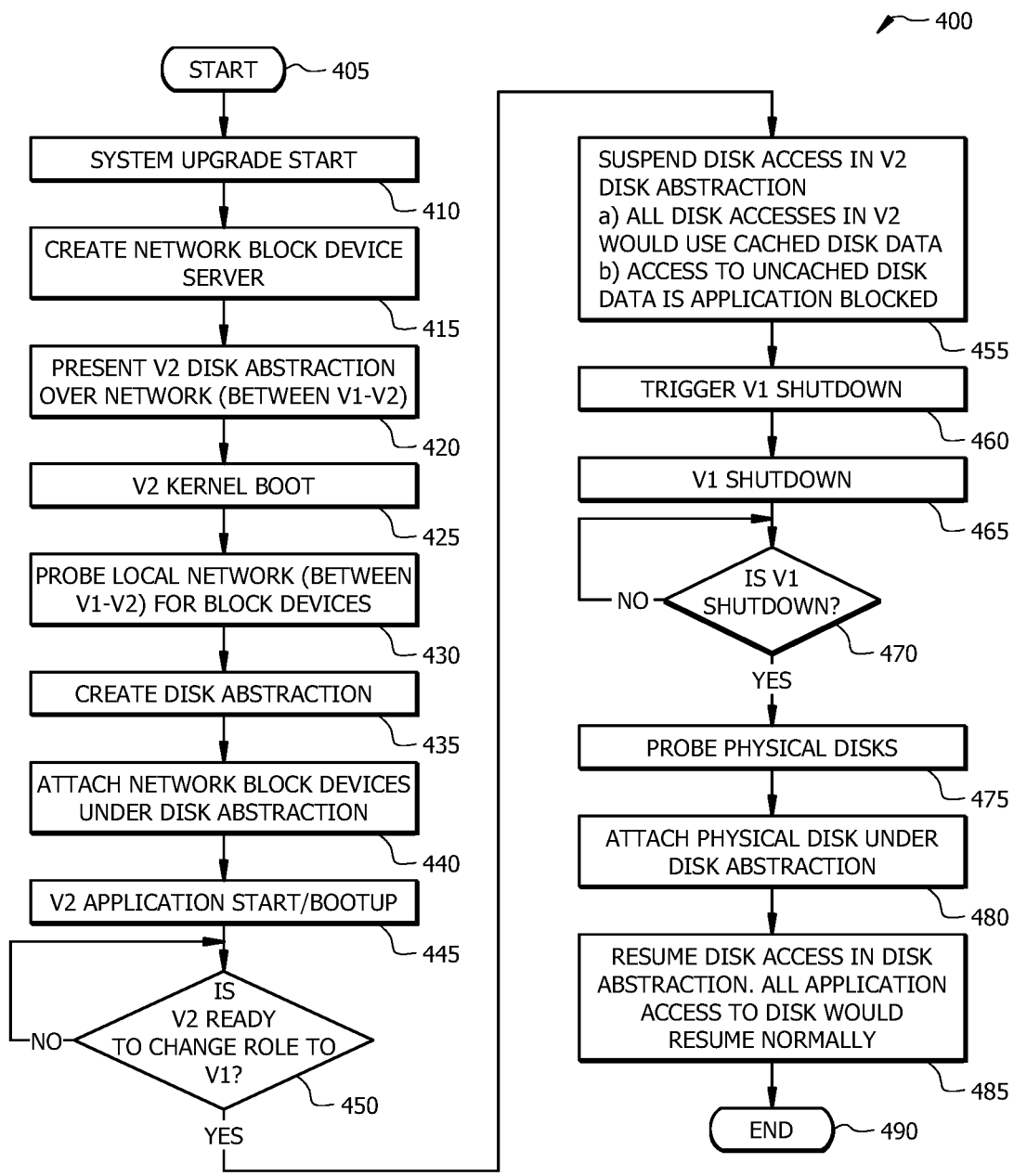
FIG. 4 illustrates a flow diagram of a method for seamless access to a common physical disk in an AMP system without an external hypervisor, in accordance with certain embodiments.

Reference is now made to FIG. 4, wherein is shown a method 400 for seamless access to a common physical disk across an AMP system, according to the present disclosure. The method 400 may begin at step 405. At step 410, a system upgrade may begin. At step 415, a network block device server may be created. At step 420, disk abstraction for the second instance may be presented over a local network between the first and second instances using a network block device disk server application. The first and second instances are referred to as V1 and V2, respectively, in FIG. 4. At step 425, the second instance may boot in RAM. At step 430, the local network between the first and second instances may be probed from the second instance for block devices using a network block device disk client application, and corresponding network block devices may be created locally. At step 435, a disk abstraction may be created for each of the network devices created in step 430. At step 440, the network block devices created in step 430 may be attached under the corresponding disk abstractions crated in step 435. At step 445, the disk abstractions mapped in step 440 may be mounted to make a local filesystem available in the second instance and then the applications in the second instance may start booting.

At step 450, a determination is made as to whether the second instance is ready to change its role to the first instance. If, at step 450, it is determined that the second instance is not ready to change its role to the first instance, the system may continue to check until the second instance is ready to change its role to the first instance. If, at step 450, it is determined that the second instance is ready to change its role to the first instance, the method may proceed to step 455 wherein disk access in the second instance is suspended through the disk abstraction of the second instance. Once the disk abstraction on the second instance is suspended, all access to disk data can only be serviced from the local disk cache. Attempt to access any data which is not available in the cache and which require access to the physical disk will result in application blocking for data availability. At step 460, first instance is triggered to shut down. At step 465, the first instance shuts down. At step 470, a determination is made as to whether the first instance has indeed shut down. If, at step 470, it is determined that the first instance has not shut down, the method will continue to check for shutdown completion of the first instance. If, at step 470, it is determined that the first instance has shut down, the method may proceed to step 475 wherein the physical disks may be probed. At step 480, the physical disk may be attached under the disk abstraction. At step 485, the disk abstraction which was suspended in step 455 may be resumed, physical disk access may resume and all application access to the disk would resume normally. At step 490, the method may end.

In sum, in an AMP facilitated system, disk abstraction may be created to abstract the method of real disk access. All application level access to the disk would be via disk abstraction. During upgrade, two types of access under disk abstraction are provided: 1) real disk access available only on owning or controlling the system; and 2) network disk access to a secondary or standby system (the second instance 320 in FIGS. 3A and 3B) provided via network disk services running from the primary or active system (the first instance 310 in FIGS. 3A and 3B). At the time of role change or switchover, disk access over disk abstraction is temporarily suspended. Applications are served from cache on top of disk abstraction. Once the primary/active system is shutdown, a real disk is enumerated and presented under the disk abstraction by the secondary/standby system. Disk access over abstraction in the secondary/standby system is then resumed, and cache updates performed while in "access suspension" are made permanent. As such, the present disclosure provides a seamless transition of disk access for applications on the secondary/standby system.

Mechanism to Migrate Logical Volume Manager Based Mass Storage Device from a Thick Provisioned Layout to a Thin Provisioned Layout on a Live System Platforms using a Logical Volume Manager (LVM) for managing mass storage may have regular logical volumes (LVs) created on physical volumes (PV) for storage. These logical volumes could use up the bulk of the available disk space. Accurately predicting future storage requirements may be difficult, and once a system is provisioned with physical volumes and logical volumes, even if a given logical volume is under-utilized, it is not possible to reduce the existing size of the logical volume to make space for new volumes without an impactful downtime. This makes redistribution of free space in the various physical volumes across logical volumes difficult. Thus, a mechanism is needed to allow redistribution of unused space in logical volumes across existing or new logical volumes in the same physical volume.

The present disclosure provides a mechanism to migrate from a statistically provisioned regular (thick) logical volume layout to an over-provisioned virtual (thin) layout with free space shared across logical volumes in the same physical volume, without impact to running services. Specifically, the present disclosure allows for the use of minimal disk space as a seed-space, creates a block device abstraction on top of the regular logical volume, copies data out from the thick provisioned to thin provisioned disk layout, and then uses the abstraction layer to switch back from a thick to a thin-provisioned block device.

Figure 5:
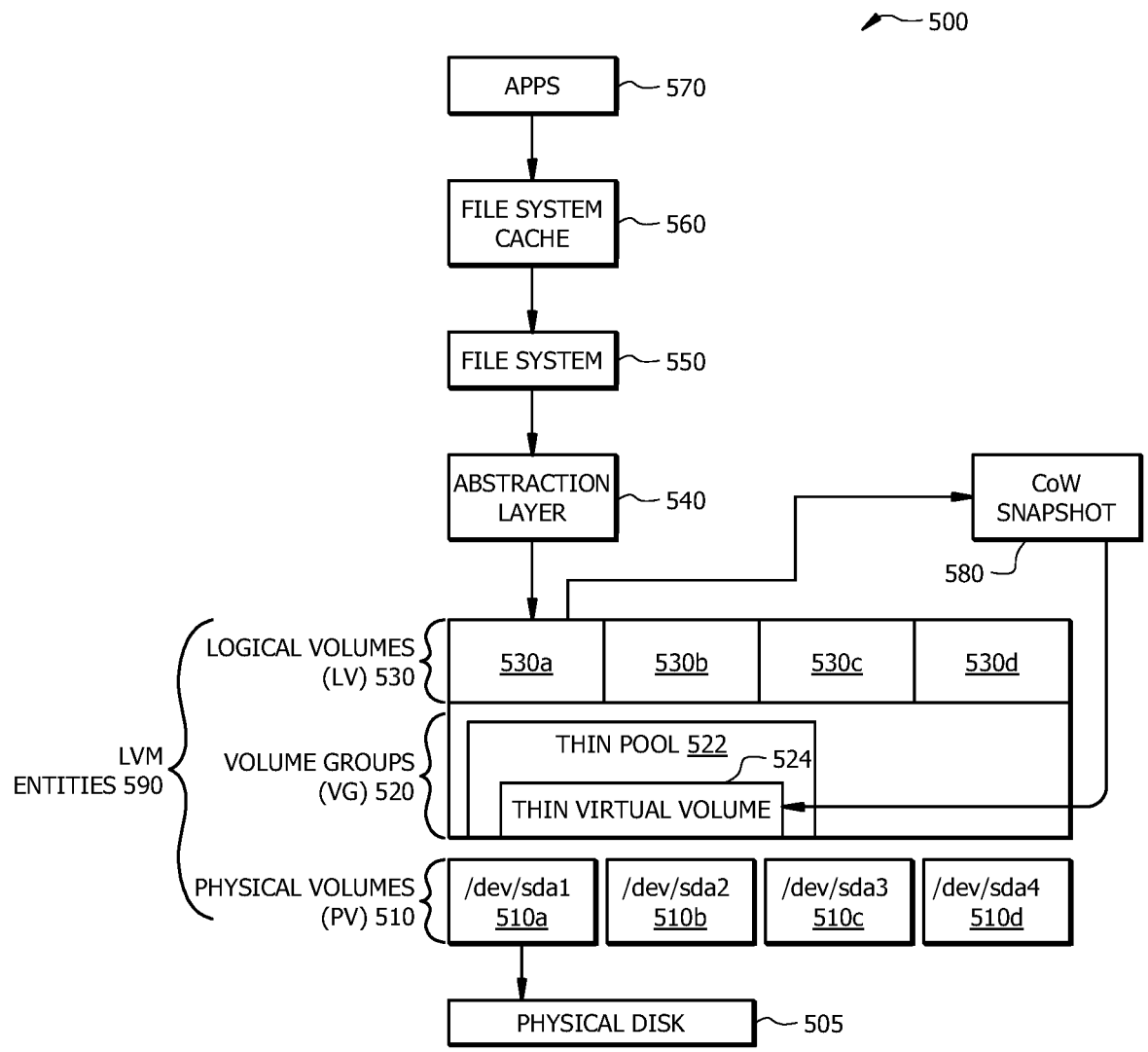
FIG. 5 illustrates a system for migrating a logical volume manager based mass storage device from a thick provisioned layout to a thin provisioned layout, in accordance with certain embodiments.

Reference is now made to FIG. 5, wherein is shown system 500 for migrating a LVM mass storage device from a thick provisioned layout to a thin provisioned layout on a live system. System 500 may include a physical disk 505, one or more physical volumes 510, one or more volume groups 520, and one or more logical volumes 530. In terms of organization, a physical disk 505 is divided into one or more physical volumes 510. Volume groups 520 are created by combining physical volumes 510. Logical volumes 530 are logical partitions created in volume groups 520. Together, the physical volumes 510, the volume groups 520, and the logical volumes 530 may be referred to as the Logical Volume Management (LVM) entities 590.

Physical volumes 510 may comprise one or more physical disk partitions 510a, 510b, 510c, 510d. By way of example, FIG. 5 shows the following physical disk partitions: /dev/sda1 510a; /dev/sda2 510b; /dev/sda3 510c; /dev/sda4 510d. The physical disk 505 may comprise a solid state drive (SSD) or hard disk drive (HDD), and may be coupled to one or more physical disk partitions 510a, 510b, 510c, 510c. The one or more logical volumes 530 may include logical volumes 530a, 530b, 530c, 530d. System 500 may further include one or more applications 570, a file system cache 560, and one or more file systems 550 accessing the one or more logical volumes 530.

A block level abstraction layer 540 (disk abstraction) may be created on top of each of the one or more logical volumes 530 at system boot. The applications 570 and/or the file systems 550 may use the abstraction layer 540 to access the one or more logical volumes 530. Specifically, the abstraction layer 540 may provide flexibility to control the access from the applications 570 and/or file systems 550 to the LVM entities 590 and/or physical disk 505, including by suspending access when access needs to be blocked and resuming when access is needed.

The process of migration may be done one volume group 520 at a time, starting from the smallest to the largest logical volume 530a, 530b, 530c, 530d associated with that particular volume group 520, assuming there is free space available in the volume group 520. According to the present disclosure, the first step in the migration to thin-provisioned logical volume is to carve out a pool of storage space from the remaining disk space. This pool of storage space may be referred to as a thin pool 522 and may be part of the volume group 520. This is the storage pool where the thin-provisioned logical volumes will be created.

The following steps may be executed for each logical volume 530a, 530b, 530c, 530d associated with the volume group 520. A Copy-on-Write (CoW) snapshot 580 may be created for the regular logical volume 530a. This may provide a checkpoint of the data in the logical volume 530a to start the migration of data. Next, a thin virtual volume 524 corresponding to the logical volume 530a may be added to the thin pool 522. While the applications 570 in user space continue to operate seamlessly on the regular logical volume 530a, data may be copied from the CoW snapshot 580 to the thin virtual volume 524. Once the copy is complete, access to that regular logical volume 530a may be suspended using the abstraction layer 540. Any access to filesystem data which is not in the file system cache 560 from the applications 570 and/or file systems 550 to that logical volume 530a may block until the abstraction layer 540 is resumed.

Next, all changes to the regular logical volume 530a from the time of creation of the CoW snapshot 580 may be computed and merged into the thin virtual volume 524. The abstraction layer 540 may be remapped from the regular logical volume 530a to point to the new thin virtual volume 524 and the abstraction layer 540 is then resumed to allow access to the lower LVM entities 590. As applications 570 in user space rely on the file system cache 560, most of the accesses will remain unaffected during the time the regular logical volume 530a access is suspended. Only new read/write accesses to the suspended logical volume 530a will momentarily be blocked. The original logical volume 530a may then be deleted and the freed up space may be added to the thin pool 522, thereby increasing the size of the storage pool that may be used by the thin virtual volumes 524. Once all of the logical volumes 530 in that volume group 520 have been migrated, the thin pool 522 may have the entire space in the volume group 520.

Figure 6:
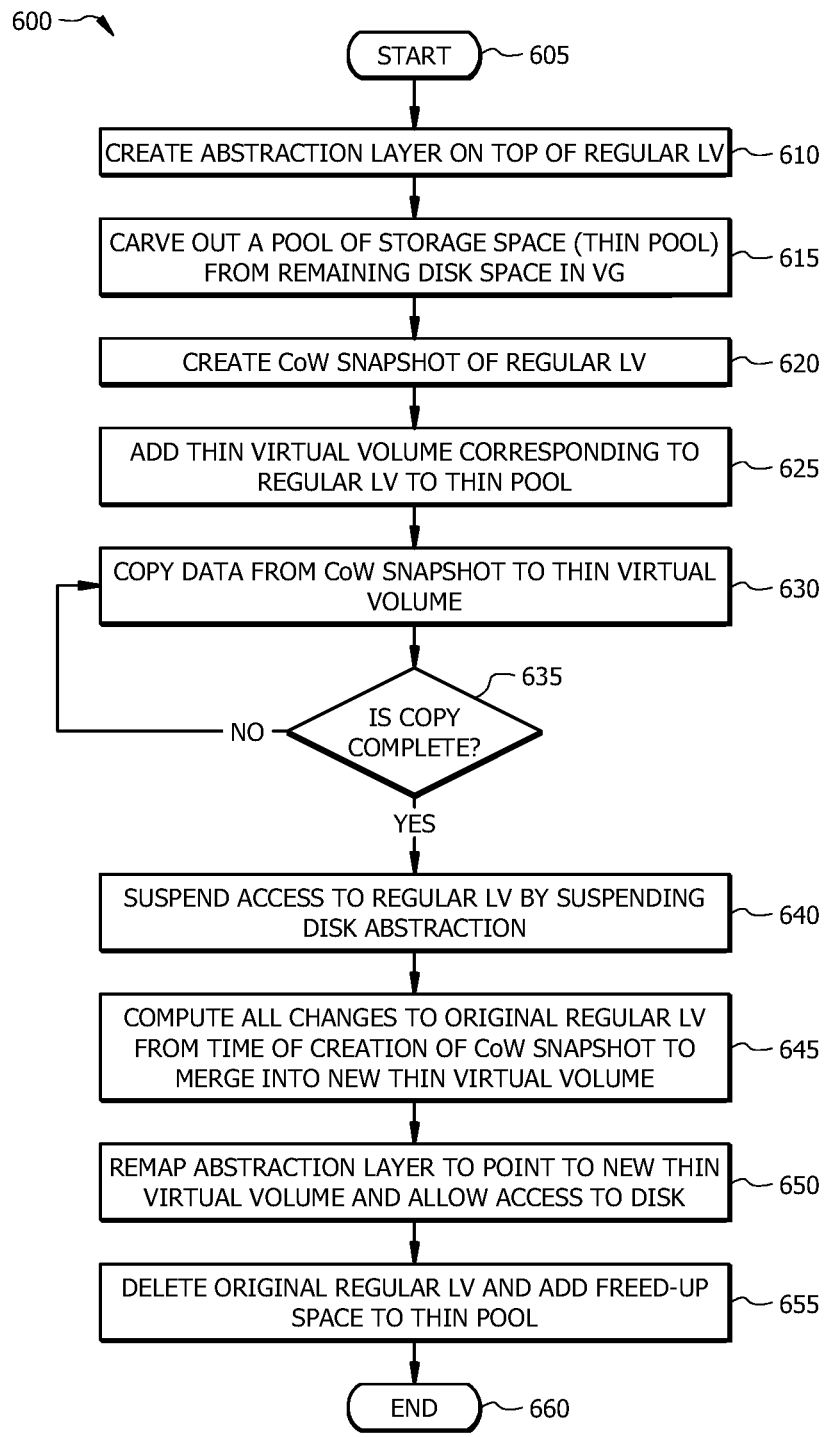
FIG. 6 illustrates a flow diagram of a method for migrating a logical volume manager based mass storage device from a thick provisioned layout to a thin provisioned layout, in accordance with certain embodiments.

Reference is now made to FIG. 6, wherein is shown a method 600 for migrating a LVM based mass storage device from a thick provisioned layout to a thin provisioned layout on a live system. The method may begin at step 605. At step 610, an abstraction layer may be created on top of a regular logical volume (referred to in FIG. 6 as "LV") at system boot. The applications and/or the file systems may use the abstraction layer to access the logical volumes. The logical volume may be one of a plurality of logical volumes in a volume group in a physical volume. At step 615, a pool of storage space, e.g., a thin pool, may be carved out from remaining disk space in a volume group (referred to in FIG. 6 as "VG"). At step 620, a Copy-on-Write (CoW) snapshot of the regular logical volume may be created. This gives the data a checkpoint to start the migration of data. At step 625, a thin virtual volume corresponding to the regular logical volume may be added to the thin pool. At step 630, data may be copied from the CoW snapshot to the thin virtual volume. User space applications may continue to operate seamlessly on the regular logical volume during this step.

At step 635, a determination may be made as to whether copy has been completed. If, at step 635, it is determined that the copy has not been completed, the method may return to step 630, wherein data may continue to be copied from the CoW snapshot to the thin virtual volume. If, at step 635, it is determined that the copying has been completed, the method may proceed to step 640, wherein access to the regular logical volume may be suspended by suspending the disk abstraction layer. Any new access from applications and/or file system to the logical volume may temporarily block. At step 645, all changes to the logical volume from the time of creation of the CoW snapshot may be computed and merged into the new thin virtual volume. At step 650, the abstraction layer may be remapped to point to the new thin virtual volume and resumed to allow access to the disk. At step 655, the original logical volume may be deleted and the freed up space may be added to the thin pool, thereby increasing the storage pool that may be used by the thin virtual volumes. Once all of the logical volumes in the volume group have been migrated, the thin pool may have the entire space in that volume group. The migration may be done one volume group at a time, starting from the smallest to the largest logical volume in that particular volume group. At step 660, the method may end.

In sum, the present disclosure may allow for conversion of the regular logical volumes to thin provisioned logical volumes dynamically without impacting system operation. Thin provisioned logical volumes may allow for over-provisioning and sharing unused space across all logical volumes using the same combined storage pool.

There are various use cases for the systems and methods disclosed in conjunction with FIGS. 5 and 6. For example, when a redistribution of disk partition size is desired, thick provisioned partitions may migrate data to thin provisioned partitions based on the above disclosure. Additionally, the systems and methods of FIGS. 5 and 6 may be applicable to desktops, servers, and embedded systems using LVM for disk management.

Figure 7:
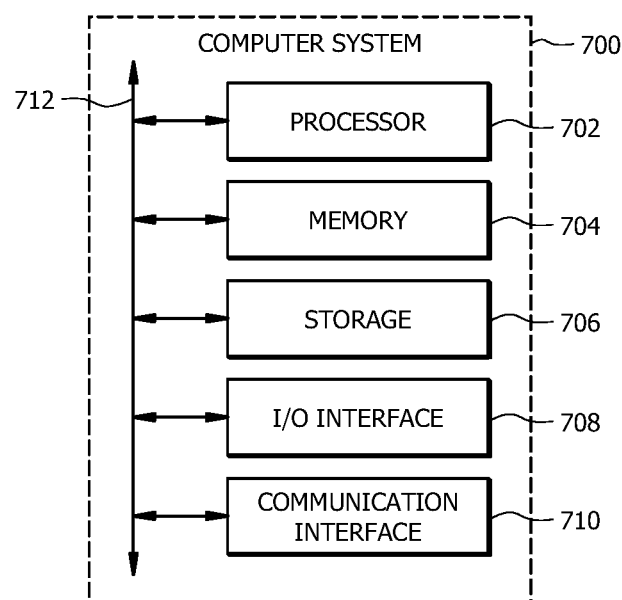
FIG. 7 illustrates a computer system, in accordance with certain embodiments.

Exemplary Computer System for Use in Connection with the Described Systems and Methods Reference is now made to FIG. 7, wherein is shown an example computer system 700. In particular embodiments, one or more computer systems 700 perform one or more steps of one or more methods (including method 200 of FIG. 2, method 400 of FIG. 4, and method 600 of FIG. 6) described or illustrated herein. In particular embodiments, one or more computer systems 700 provide functionality for the systems (including system 100 of FIG. 1, system 300 of FIG. 3, and system 500 of FIG. 5) described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and
one or more computer-readable non-transitory storage media comprising instructions that, when executed by the one or more processors, cause one or more components of the system to perform operations comprising:
identifying data for transmission from a first instance to a second instance;
writing, by the first instance, the data into a first ring of a shared memory, the first ring configured as a first transmit ring for the first instance;
sending an inter-processor interrupt to the second instance to alert the second instance of the data written into the first ring;
reading, by the second instance, the data from the first ring, the first ring configured as a first receive ring for the second instance; and
transmitting the data to an application of the second instance.

2. The system of claim 1, wherein the data is written into a first buffer of the first ring, the first buffer being one of a first plurality of buffers in the first ring, each buffer of the first plurality of buffers identified by a sequential index indicating its position among the first plurality of buffers in the first transmit ring and the first receive ring of the first ring.

3. The system of claim 2, the operation of writing further comprising:
setting a payload length in a header of the first buffer, the payload length associated with a length of the data;
setting a READY bit in the header of the first buffer; and
incrementing the sequential index of the first transmit ring.

4. The system of claim 3, wherein the operation of incrementing the sequential index of the first transmit ring informs the first instance that its next writing operation comprises writing into a second buffer of the first ring.

5. The system of claim 3, the operation of reading further comprising:
reading the payload length from the header of the first buffer of the first receive ring;
copying the data from the first buffer into a memory associated with the second instance;
clearing the READY bit from the header of the first buffer; and
incrementing the sequential index of the first receive ring.

6. The system of claim 3, the operations further comprising:
identifying second data for transmission from the second instance to the first instance;
writing, by the second instance, the second data into a second ring of the shared memory, the second ring configured as a second transmit ring for the second instance;
sending a second inter-processor interrupt to the first instance to alert the first instance of the second data written into the second ring;
reading, by the first instance, the second data from the second ring, the second ring configured as a second receive ring for the first instance; and transmitting the second data to a second application of the first instance.

7. The system of claim 6, wherein the second data is written into a buffer of the second ring, the buffer being one of a second plurality of buffers in the second ring.

8. A method, comprising:
identifying data for transmission from a first instance to a second instance;
writing, by the first instance, the data into a first ring of a shared memory, the first ring configured as a first transmit ring for the first instance;
sending an inter-processor interrupt to the second instance to alert the second instance of the data written into the first ring;
reading, by the second instance, the data from the first ring, the first ring configured as a first receive ring for the second instance; and
transmitting the data to an application of the second instance.

9. The method of claim 8, wherein the data is written into a first buffer of the first ring, the first buffer being one of a first plurality of buffers in the first ring, each buffer of the first plurality of buffers identified by a sequential index indicating its position among the first plurality of buffers in the first transmit ring and the first receive ring of the first ring.

10. The method of claim 9, the writing step further comprising:
setting a payload length in a header of the first buffer, the payload length associated with a length of the data;
setting a READY bit in the header of the first buffer; and
incrementing the sequential index of the first transmit ring.

11. The method of claim 10, wherein the step of incrementing the sequential index of the first transmit ring informs the first instance that its next writing operation comprises writing into a second buffer of the first ring.

12. The method of claim 10, the reading step further comprising:
reading the payload length from the header of the first buffer of the first receive ring;
copying the data from the first buffer into a memory associated with the second instance;
clearing the READY bit from the header of the first buffer; and
incrementing the sequential index of the first receive ring.

13. The method of claim 10, further comprising:
identifying second data for transmission from the second instance to the first instance;
writing, by the second instance, the second data into a second ring of the shared memory, the second ring configured as a second transmit ring for the second instance;
sending a second inter-processor interrupt to the first instance to alert the first instance of the second data written into the second ring;
reading, by the first instance, the second data from the second ring, the second ring configured as a second receive ring for the first instance; and
transmitting the second data to a second application of the first instance.

14. The method of claim 13, wherein the second data is written into a buffer of the second ring, the buffer being one of a second plurality of buffers in the second ring.

15. One or more computer-readable non-transitory storage media embodying instructions that, when executed by a processor, cause performance of operations comprising:
identifying data for transmission from a first instance to a second instance;
writing, by the first instance, the data into a first ring of a shared memory, the first ring configured as a first transmit ring for the first instance;
sending an inter-processor interrupt to the second instance to alert the second instance of the data written into the first ring;
reading, by the second instance, the data from the first ring, the first ring configured as a first receive ring for the second instance; and
transmitting the data to an application of the second instance.

16. The one or more computer-readable non-transitory storage media of claim 15, wherein the data is written into a first buffer of the first ring, the first buffer being one of a first plurality of buffers in the first ring, each buffer of the first plurality of buffers identified by a sequential index indicating its position among the first plurality of buffers in the first transmit ring and the first receive ring of the first ring.

17. The one or more computer-readable non-transitory storage media of claim 16, the operation of writing further comprising:
setting a payload length in a header of the first buffer, the payload length associated with a length of the data;
setting a READY bit in the header of the first buffer; and
incrementing the sequential index of the first transmit ring.

18. The one or more computer-readable non-transitory storage media of claim 17, the operation of reading further comprising:
reading the payload length from the header of the first buffer of the first receive ring;
copying the data from the first buffer into a memory associated with the second instance;
clearing the READY bit from the header of the first buffer; and
incrementing the sequential index of the first receive ring.

19. The one or more computer-readable non-transitory storage media of claim 17, the operations further comprising:
identifying second data for transmission from the second instance to the first instance;
writing, by the second instance, the second data into a second ring of the shared memory, the second ring configured as a second transmit ring for the second instance;
sending a second inter-processor interrupt to the first instance to alert the first instance of the second data written into the second ring;
reading, by the first instance, the second data from the second ring, the second ring configured as a second receive ring for the first instance; and
transmitting the second data to a second application of the first instance.

20. The one or more computer-readable non-transitory storage media of claim 19, wherein the second data is written into a buffer of the second ring, the buffer being one of a second plurality of buffers in the second ring.

* * * * *